United States Patent
Kim et al.

(10) Patent No.: US 11,560,800 B1
(45) Date of Patent: Jan. 24, 2023

(54) AIRFOIL WITH FIBER PLIES HAVING INTERDIGITATED FINGERS IN TRAILING END

(71) Applicant: RAYTHEON TECHNOLOGIES CORPORATION, Farmington, CT (US)

(72) Inventors: Russell Kim, Glastonbury, CT (US); Jonas S. Banhos, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/525,005

(22) Filed: Nov. 12, 2021

(51) Int. Cl.
  *F01D 5/14* (2006.01)
  *F01D 5/28* (2006.01)
  *F01D 5/20* (2006.01)

(52) U.S. Cl.
  CPC ............... *F01D 5/147* (2013.01); *F01D 5/20* (2013.01); *F01D 5/282* (2013.01); *F05D 2220/323* (2013.01); *F05D 2300/6033* (2013.01)

(58) Field of Classification Search
  CPC ... F01D 5/147; F01D 5/282; F05D 2300/6033
  See application file for complete search history.

(56) References Cited

U.S. PATENT DOCUMENTS

| | | | |
|---|---|---|---|
| 8,038,408 B2 | 10/2011 | McMillan | |
| 10,859,268 B2* | 12/2020 | Whittle | F23R 3/16 |
| 11,035,239 B2 | 6/2021 | de Diego et al. | |
| 2014/0286765 A1* | 9/2014 | Hoyland | F01D 9/041 415/200 |
| 2016/0273372 A1* | 9/2016 | Podgorski | F01D 9/041 |
| 2017/0298745 A1* | 10/2017 | Freeman | F04D 29/023 |
| 2018/0179906 A1* | 6/2018 | Schetzel | F01D 25/005 |
| 2019/0145269 A1* | 5/2019 | Campbell | F01D 5/282 416/223 R |
| 2019/0195073 A1* | 6/2019 | Sakala | B29C 70/70 |
| 2020/0003061 A1* | 1/2020 | Lanfant | B29C 70/222 |
| 2020/0141268 A1* | 5/2020 | Kray | F01D 5/282 |
| 2020/0182066 A1* | 6/2020 | Theertham | F01D 5/147 |
| 2020/0378267 A1* | 12/2020 | Shinavski | F01D 5/147 |
| 2021/0095571 A1* | 4/2021 | Fernandez | F01D 11/16 |
| 2021/0262353 A1* | 8/2021 | McCaffrey | B32B 5/263 |

* cited by examiner

*Primary Examiner* — Long T Tran
(74) *Attorney, Agent, or Firm* — Carlson, Gaskey & Olds, P.C.

(57) ABSTRACT

An airfoil includes an airfoil section defining suction and pressure sides and leading and a trailing ends, the airfoil section being formed of a fiber-reinforced composite comprised of fiber plies, the fiber plies including at least one core fiber ply defining a tube that circumscribes an internal cavity and an overwrap fiber ply that wraps around the at least one core fiber ply, and aft of the internal cavity the overwrap fiber ply on the pressure side including first fingers and the overwrap ply on the suction side including second fingers, the first fingers being interdigitated with the second fingers to form an interlocked joint in the trailing end.

20 Claims, 4 Drawing Sheets

AIRFOIL WITH FIBER PLIES HAVING INTERDIGITATED FINGERS IN TRAILING END

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section that defines suction and pressure sides and leading and trailing ends. The airfoil section is formed of a fiber-reinforced composite comprised of fiber plies. The fiber plies include at least one core fiber ply that defines a tube that circumscribes an internal cavity and an overwrap fiber ply that wraps around the at least one core fiber ply. Aft of the internal cavity, the overwrap fiber ply on the pressure side includes first fingers and the overwrap ply on the suction side includes second fingers. The first fingers are interdigitated with the second fingers to form an interlocked joint in the trailing end.

In a further embodiment of the foregoing embodiment, each of the first and second fingers has a forward finger section, an aft finger section that terminates at a fingertip, and a radial finger height, and the radial finger height of the aft finger section is less than the radial finger height of the forward finger section.

In a further embodiment of any of the foregoing embodiments, the aft finger sections define radial gaps there between.

In a further embodiment of any of the foregoing embodiments, the aft finger sections of the first fingers are arranged with an offset from the aft finger sections of the second fingers in a cross-radial direction.

In a further embodiment of any of the foregoing embodiments, the fiber plies further include a reinforcement ply interleaved with the aft finger sections through the gaps.

A further embodiment of any of the foregoing embodiments further includes at least one outer shell ply adjacent the overwrap ply, the at least one outer shell ply on the suction side and the at least one outer shell ply on the pressure side converging in the trailing end such that the interlocked joint is sandwiched there between.

In a further embodiment of any of the foregoing embodiments, the first and second fingers are straight.

In a further embodiment of any of the foregoing embodiments, the first and second fingers are hooked.

In a further embodiment of any of the foregoing embodiments, the first and second fingers are L-shaped.

In a further embodiment of any of the foregoing embodiments, each of the first and second fingers has a forward finger section and a finger hook section that projects radially from the forward finger section.

In a further embodiment of any of the foregoing embodiments, the first and second fingers are hooked in opposite radial directions such that the finger hook sections of the first fingers radially overlap the finger hook sections of the second fingers.

A further embodiment of any of the foregoing embodiments further includes at least one outer shell ply adjacent the overwrap ply, the at least one outer shell ply on the suction side and the at least one outer shell ply on the pressure side converging in the trailing end such that the interlocked joint is sandwiched there between.

In a further embodiment of any of the foregoing embodiments, the fiber-reinforced composite is a ceramic matrix composite.

A gas turbine engine according to an example of the present disclosure includes a compressor section, a combustor in fluid communication with the compressor section, and a turbine section in fluid communication with the combustor. The turbine section or the compressor section has airfoils according to any of the foregoing embodiments disposed about a central axis of the gas turbine engine.

In a further embodiment of any of the foregoing embodiments, each of the first and second fingers has a forward finger section, an aft finger section that terminates at a fingertip, and a radial finger height, the radial finger height of the aft finger section is less than the radial finger height of the forward finger section, and the aft finger sections define radial gaps there between.

In a further embodiment of any of the foregoing embodiments, the aft finger sections of the first fingers are arranged with an offset from the aft finger sections of the second fingers in a cross-radial direction, and the fiber plies further include a reinforcement ply interleaved with the aft finger sections through the radial gaps.

A further embodiment of any of the foregoing embodiments further includes at least one outer shell ply adjacent the overwrap ply, the at least one outer shell ply on the suction side and the at least one outer shell ply on the pressure side converging in the trailing end such that the interlocked joint is sandwiched there between.

In a further embodiment of any of the foregoing embodiments, the first and second fingers are hooked.

In a further embodiment of any of the foregoing embodiments, each of the first and second fingers has a forward finger section and a finger hook section that projects radially from the forward finger section.

In a further embodiment of any of the foregoing embodiments, the first and second fingers are hooked in opposite radial directions such that the finger hook sections of the first fingers radially overlap the finger hook sections of the second fingers.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
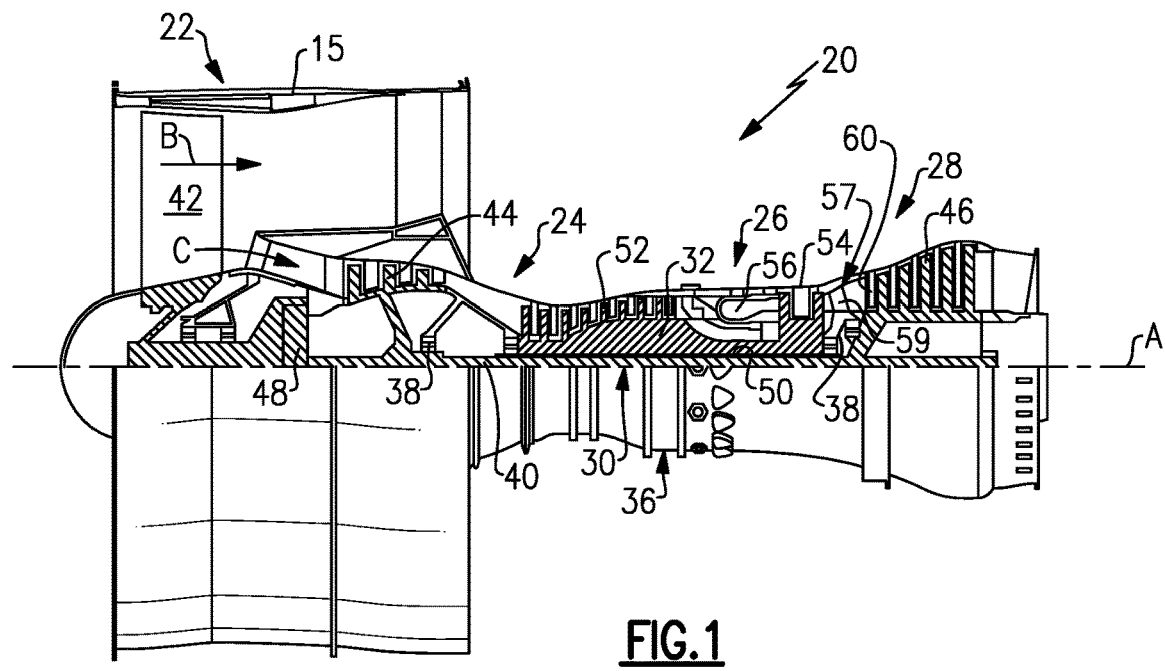
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
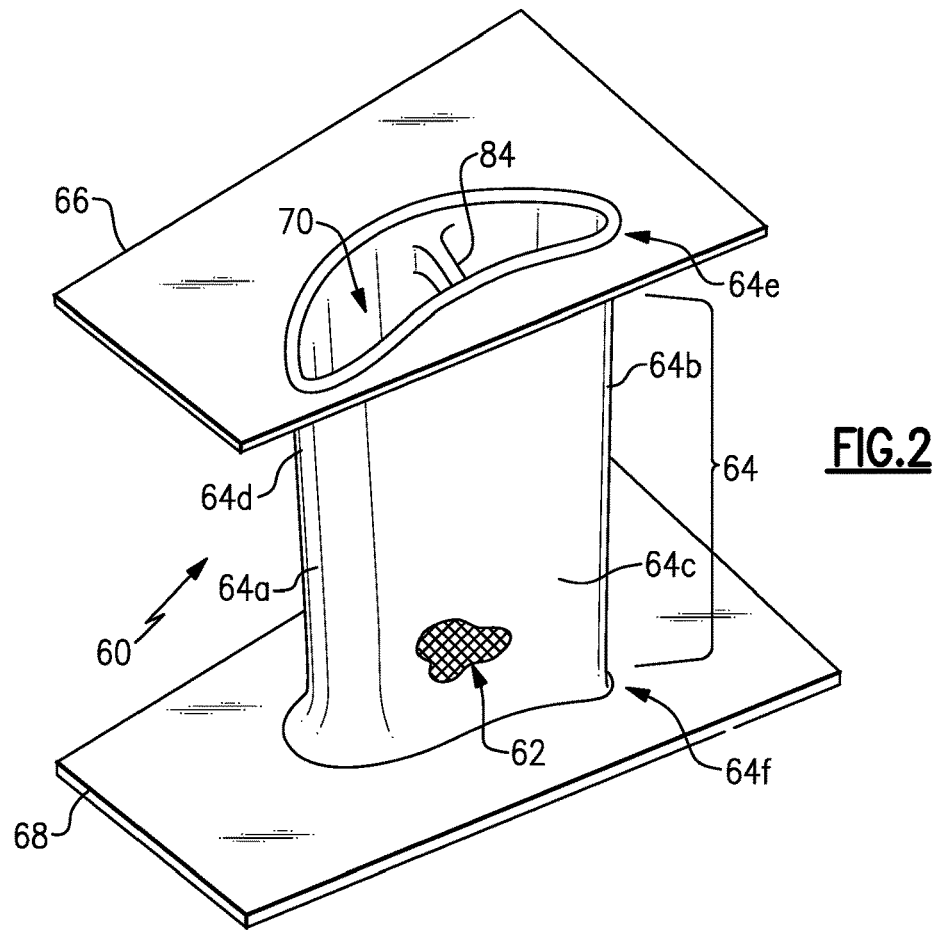
FIG. 2 illustrates an airfoil of the gas turbine engine.

FIG. 2 illustrates an isometric view of an example airfoil 60 from the turbine section 28 of the engine 20 (see also FIG. 1). For instance, the airfoil 60 is supported between inner and outer support hardware and there are multiple airfoils 60 arranged in a circumferential row in the engine 20. It is to be understood that although the examples herein may be shown in context of a vane from the turbine section 28, the examples can be applied to turbine blades or other types of airfoils in other portions of the engine 20.

The airfoil 60 is formed of a fiber-reinforced composite 62 (shown in partial cutaway view). For example, the fiber-reinforced composite 62 is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply or a 3D structure.

In the illustrated example, the airfoil 60 is comprised of an airfoil section 64 and first and second platforms 66/68 between which the airfoil section 64 extends. The airfoil section 64 circumscribes an internal cavity 70 and defines leading and trailing ends 64a/64b and first and second sides 64c/64d that join the leading and trailing ends 64a/64b. In this example, the first side 64c is a pressure side and the second side 64d is a suction side. The airfoil section 64 spans radially, relative to the central engine axis A, between a first (outer) radial end 64e to a second (inner) radial end 64f. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

Figure 3:
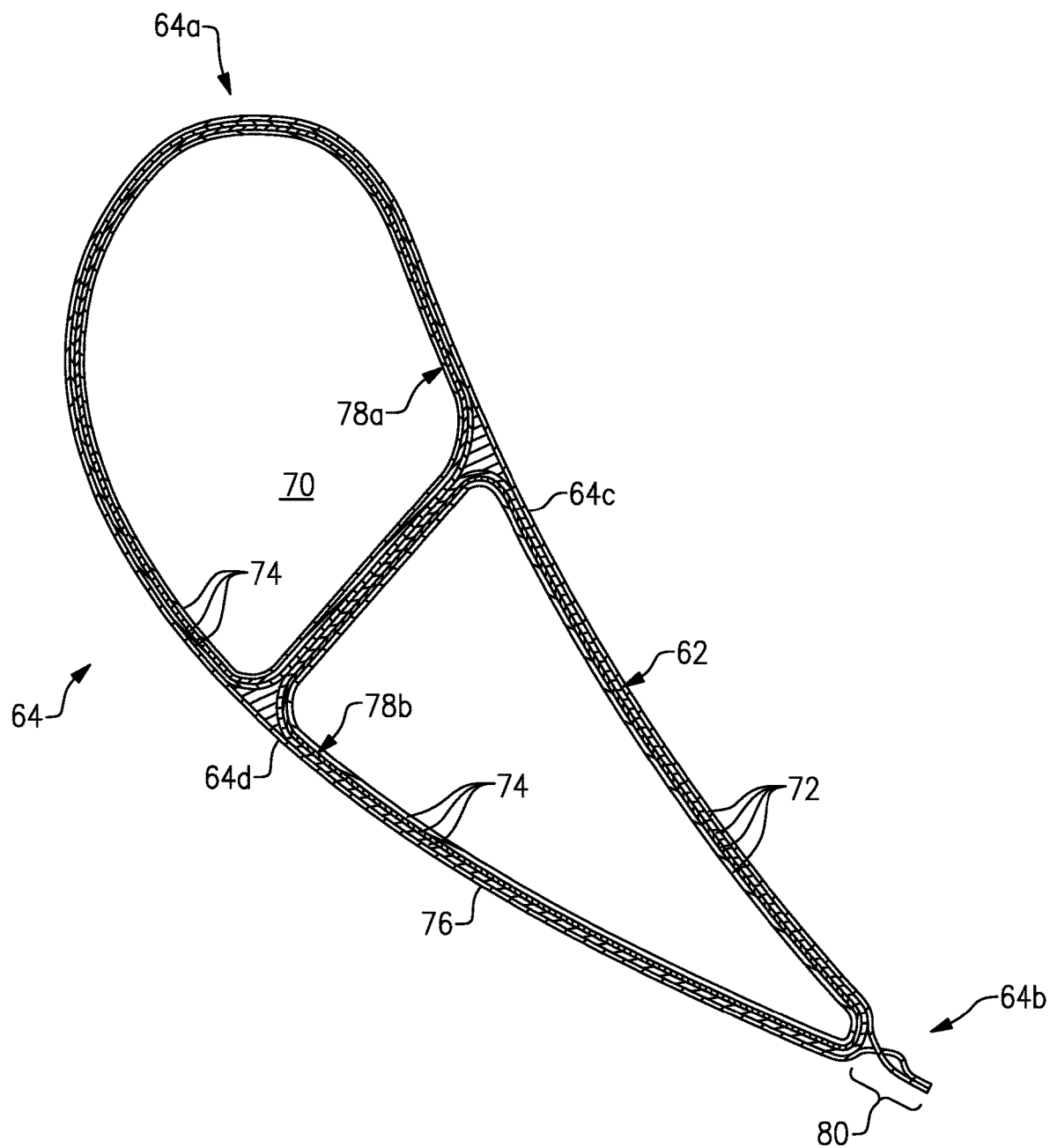
FIG. 3 illustrates a sectioned view of a portion of the airfoil showing fiber plies.

FIG. 3 shows a sectioned view of the airfoil section 64. The aforementioned fiber-reinforced composite 62 is comprised of fiber plies 72. The fiber tows of the fiber plies 72 are arranged in a fiber architecture, which refers to an ordered arrangement of the tows relative to one another. For example, the fiber plies 72 are 2D woven plies, such as but not limited to, harness satin weave plies (e.g., 8 harness satin weave) or braided plies (e.g., bi- or tri-axial braid).

The fiber plies 72 include one or more core fiber plies 74 and one or more overwrap fiber plies 76. Although a number of the fiber plies are shown in the examples, it is to be understood additional or fewer plies 72 may be used. In the illustrated example there are two sets of core fiber plies 74, which are arranged as, respectively, first and second radial tubes 78a/78b. The first tube 78a is a forward tube that circumscribes a forward sub-cavity of the internal cavity 70, and the second tube 78b is an aft tube that circumscribes an aft sub-cavity of the internal cavity 70. It is to be appreciated that one or more additional sets of core fiber plies 74 and tubes could be used, or only a single set of core fiber plies 74 and a single tube. The one or more overwrap fiber plies 76 wrap around the core fiber plies 74. For instance, each overwrap fiber ply 76 starts in the trailing end 64b and extends continuously along the first side 64c, around the leading end 64a, and along the second side 64d before terminating in the trailing end 64b. Thus, the overwrap fiber ply or plies 76 completely encompass the core fiber plies 74.

In general, the fiber-reinforced composite 62 has significantly lower thermal conductivity than superalloys and does not possess the same strength and ductility characteristics, making it more susceptible to distress from thermal gradients and the thermally induced stresses those cause. The high strength and toughness of superalloys permits resistance to thermal stresses, whereas by comparison materials such as ceramics are more prone to distress from thermal stress. Thermal stresses may cause distress at relatively weak locations, such as along interlaminar interfaces between fiber plies or in noodle regions at fillets between wall sections. For example, in the space where fiber plies depart from each other there may be a noodle, which is a filler material that usually does not significantly contribute to strength and durability. Noodles may have relatively poor strength and can be challenging to fully densify with ceramic matrix. In this regard, the airfoil 60 includes a ply architecture in the trailing end 64b to facilitate stress mitigation and elimination or reduction in noodles.

Figure 4A:
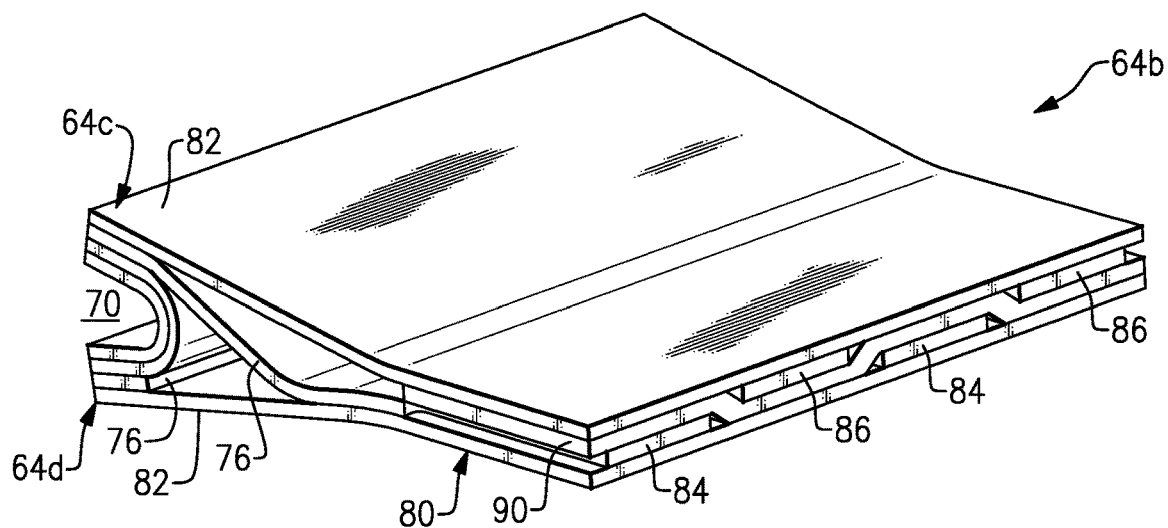
FIG. 4A illustrates an interlocked joint in a trailing end of the airfoil.
Figure 4B:
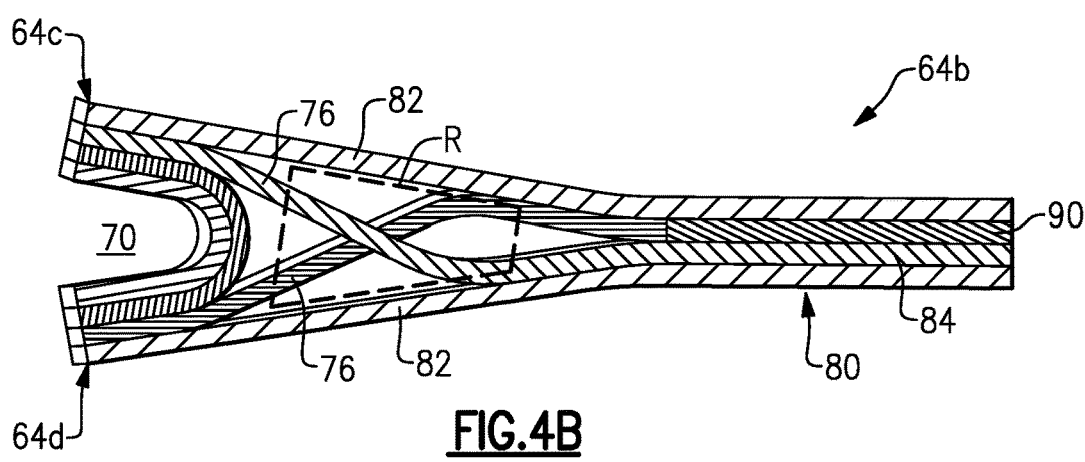
FIG. 4B illustrates a radial view of the interlocked joint.
Figure 4C:
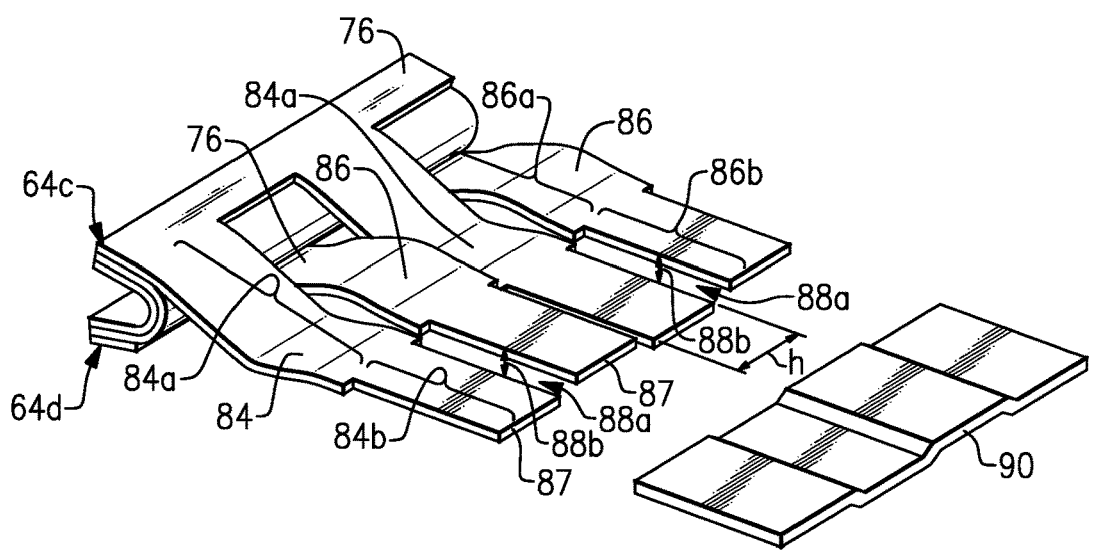
FIG. 4C illustrates an expanded view of the interlocked joint.

The ply architecture is represented by an interlocked joint 80 formed by the convergence of the portion of the overwrap fiber ply 76 from the pressure side 64c with the portion of the overwrap ply 76 from the suction side 64d in the trialing end 64b. FIG. 4A shows an example of the interlocked joint 80, which is also shown in a radial view in FIG. 4B and in an expanded view in FIG. 4C. Referring to these figures, the fiber plies 72 in this example also include at least one outer shell ply 82 adjacent the overwrap ply 76, which may also be considered to be an additional overwrap ply.

The overwrap ply 76 from the pressure side 64c includes first fingers 84 and the overwrap ply 76 from the suction side 64d includes second fingers 86. The fingers 84/86 in this example are straight in that they each generally extend in an axial direction and do not curve or hook on the radial direction. The fingers 84/86 converge toward each other in the trailing end 64b and cross in the cross-radial direction (which is also the tangential direction relative to the central longitudinal axis A of the engine 20) in region R immediately aft of the internal cavity 70. After crossing, the first and second fingers 84/86 again converge and interdigitate to form the interlocked joint 80.

In the illustrated example, each finger 84/86 has a respective forward finger section 84a/86a, an aft finger section 84b/86b that terminates at a fingertip 87, and a radial finger height (h). The fingers 84/86 are of a uniform height (h) along their lengths in the forward finger sections 84a/86a. The height (h) of the fingers 84/86 then decreases at the aft finger sections 84b/86b such that in those sections the height (h) is also uniform but is less than that of the forward finger sections 84a/86a. For instance, the radially inner and outer edges of the aft finger sections 84b/86b are recessed from the edges of the forward finger sections 86a/86b such that radial gaps 88a are formed between adjacent fingers 84/86. Such "narrow" fingers 84/86 may facilitate uniformity of stresses. Alternatively, the full lengths of the fingers 84/86 have the height (h) of the forward finger sections 84a/86a such that the gaps 88a run the full axial extent of the fingers 84/86. Such "wide" fingers may facilitate lowering cost. The aft finger sections 84b of the first fingers 84 are also arranged with an offset 88b in the tangential direction from the aft finger sections 86b of the second fingers 86.

The gaps 88a and offsets 88b provide a circuitous space for a reinforcement ply 90. The reinforcement ply 90 is interleaved with the aft finger sections 84a/84b through the gaps 88a and offsets 88b. The reinforcement ply 90 further interlocks the fingers 84/86 to enhance strength. If additional strengthening is desired, the reinforcement ply 90 and the fingers 84/86 may be stitched or pinned together in the tangential direction. The reinforcement ply 90 may also serve to control thickness of the trailing end 64b. For instance, several reinforcement plies 90 make for a relatively thicker trailing end 64b, while fewer reinforcement plies make for a relatively thinner trailing end 64b. The outer shell ply 82 from the suction side 64c and the outer shell ply 82 from the pressure side 64d converge in the trailing end 64b such that the interlocked joint 80 is sandwiched there between (FIG. 4A). The outer shell ply 82 thus protects and encloses the interlocked joint 80. On the other hand, if an implementation does not require as much strengthening and/or stiffening, or if adjustment of the thickness of the trailing end 64b is not needed, the gaps 88a, offset 88b, and reinforcement ply 90 can be excluded. If excluded, then the fingers 84/86 would converge into a common radially-oriented plane in the trailing end 64b such that the trailing end 64b also has a uniform height equal to the combined thickness of the individual plies.

In addition to providing strength, and in particular in the region R (FIG. 4B), the crossing and interdigitation of the fingers 84/86 takes up space that would otherwise be void and require a noodle or noodles. The occupation of at least a portion of the region R by the fingers 84/86 thereby eliminates, or reduces the need for, noodles in that location. Moreover, if additional cooling is desired in the trailing end 64b, the spaces between the fingers 84/86 in the region R can serve as radial cooling passages for cooling air flow. Furthermore, the spaces may also provide greater access to the fiber plies 72 during ceramic matrix consolidation when manufacturing the airfoil 60.

Figure 5A:
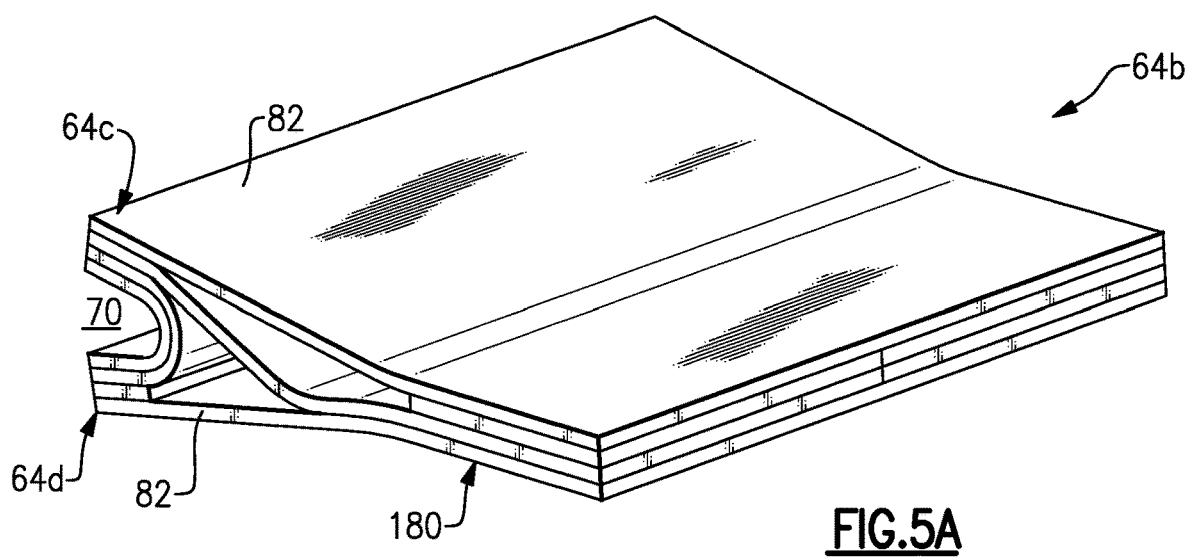
FIG. 5A illustrates another example interlocked joint in a trailing end of the airfoil.
Figure 5B:
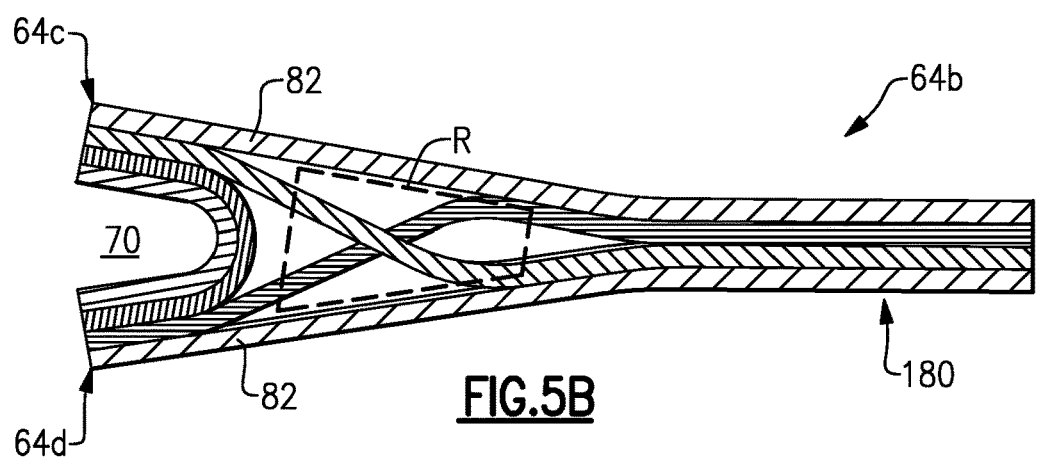
FIG. 5B illustrates a radial view of the interlocked joint.
Figure 5C:
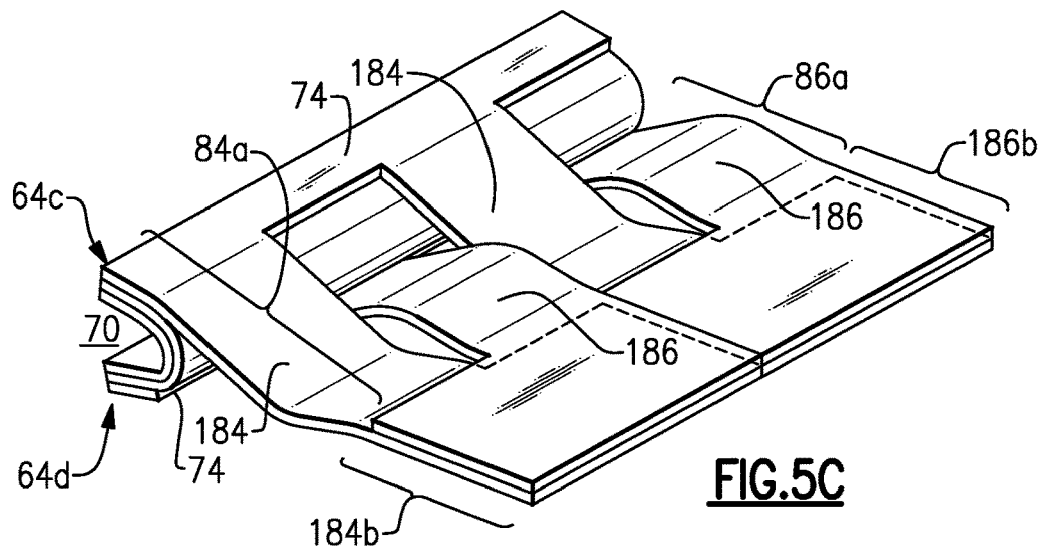
FIG. 5C illustrates a view of the interlocked joint without an outer shell fiber ply.

FIG. 5A shows another example of an interlocked joint 180, which is also shown in a radial view in FIG. 5B and without the outer shell ply 82 in FIG. 5C. The interlocked joint 180 is similar to the joint 80 except that the fingers 184/186 are hooked and there is no reinforcement ply.

In the illustrated example, the aft finger sections are finger hook sections 184b/186b that project radially from the respective forward finger sections 84a/86a such that the fingers 184/186 are L-shaped (note that the finger hook sections 184a are mostly obscured from view in FIG. 5C by the finger hook sections 186b and are thus partially shown in dashed lines). The fingers 184/186 are hooked in opposite radial directions such that the finger hook sections 184b of the first fingers 184 hook in one radial direction and the finger hook sections 186b hook in the opposite direction to radially overlap with the finger hook sections 184b. Thus, not only are the fingers 184/186 interdigitated by alternating radially, but the overlapping of the hook sections 184b/186b serves to interlock the fingers 184/186 in the tangential direction for enhanced stiffness and strength. Similar to the example above, if additional strengthening is desired, the fingers 184/186 may be stitched or pinned together in the tangential direction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section defining suction and pressure sides and leading and trailing ends, the airfoil section being formed of a fiber-reinforced composite comprised of fiber plies, the fiber plies including at least one core fiber ply defining a tube that circumscribes an internal cavity and an overwrap fiber ply that wraps around the at least one core fiber ply, and aft of the internal cavity the overwrap fiber ply on the pressure side including first fingers and the overwrap ply on the suction side including second fingers, the first fingers being interdigitated with the second fingers to form an interlocked joint in the trailing end.

2. The airfoil as recited in claim 1, wherein each of the first and second fingers has a forward finger section, an aft finger section that terminates at a fingertip, and a radial finger height, and the radial finger height of the aft finger section is less than the radial finger height of the forward finger section.

3. The airfoil as recited in claim 2, wherein the aft finger sections define radial gaps there between.

4. The airfoil as recited in claim 3, wherein the aft finger sections of the first fingers are arranged with an offset from the aft finger sections of the second fingers in a cross-radial direction.

5. The airfoil as recited in claim 4, wherein the fiber plies further include a reinforcement ply interleaved with the aft finger sections through the gaps.

6. The airfoil as recited in claim 5, further comprising at least one outer shell ply adjacent the overwrap ply, the at least one outer shell ply on the suction side and the at least one outer shell ply on the pressure side converging in the trailing end such that the interlocked joint is sandwiched there between.

7. The airfoil as recited in claim 1, wherein the first and second fingers are straight.

8. The airfoil as recited in claim 1, wherein the first and second fingers are hooked.

9. The airfoil as recited in claim 1, wherein the first and second fingers are L-shaped.

10. The airfoil as recited in claim 1, wherein each of the first and second fingers has a forward finger section and a finger hook section that projects radially from the forward finger section.

11. The airfoil as recited in claim 10, wherein the first and second fingers are hooked in opposite radial directions such that the finger hook sections of the first fingers radially overlap the finger hook sections of the second fingers.

12. The airfoil as recited in claim 11, further comprising at least one outer shell ply adjacent the overwrap ply, the at least one outer shell ply on the suction side and the at least one outer shell ply on the pressure side converging in the trailing end such that the interlocked joint is sandwiched there between.

13. The airfoil as recited in claim 1, wherein the fiber-reinforced composite is a ceramic matrix composite.

14. A gas turbine engine comprising:
a compressor section;
a combustor in fluid communication with the compressor section; and
a turbine section in fluid communication with the combustor, the turbine section or the compressor section having airfoils disposed about a central axis of the gas turbine engine, each of the airfoils includes:

an airfoil section defining suction and pressure sides and leading and a trailing ends, the airfoil section being formed of a fiber-reinforced composite comprised of fiber plies, the fiber plies including at least one core fiber ply defining a tube that circumscribes an internal cavity and a plurality of overwrap fiber plies that wrap around the at least one core fiber ply, aft of the internal cavity the overwrap fiber plies on the pressure side including first fingers and the overwrap plies on the suction side including second fingers, and the first fingers being interdigitated with the second fingers to form an interlocked joint in the trailing end.

15. The gas turbine engine as recited in claim 14, wherein each of the first and second fingers has a forward finger section, an aft finger section that terminates at a fingertip, and a radial finger height, the radial finger height of the aft finger section is less than the radial finger height of the forward finger section, and the aft finger sections define radial gaps there between.

16. The gas turbine engine as recited in claim 15, wherein the aft finger sections of the first fingers are arranged with an offset from the aft finger sections of the second fingers in a cross-radial direction, and the fiber plies further include a reinforcement ply interleaved with the aft finger sections through the radial gaps.

17. The gas turbine engine as recited in claim 16, further comprising at least one outer shell ply adjacent the overwrap ply, the at least one outer shell ply on the suction side and the at least one outer shell ply on the pressure side converging in the trailing end such that the interlocked joint is sandwiched there between.

18. The gas turbine engine as recited in claim 14, wherein the first and second fingers are hooked.

19. The gas turbine engine as recited in claim 18, wherein each of the first and second fingers has a forward finger section and a finger hook section that projects radially from the forward finger section.

20. The airfoil as recited in claim 19, wherein the first and second fingers are hooked in opposite radial directions such that the finger hook sections of the first fingers radially overlap the finger hook sections of the second fingers.

* * * * *